United States Patent [19]
Hoffman, Jr. et al.

[11] 3,805,139
[45] Apr. 16, 1974

[54] PROGRAMMED WAVEFORM POWER INVERTER CONTROL SYSTEM

[75] Inventors: Harry Swartzlander Hoffman, Jr., Saugerties; Kenton Hugh Knickmeyer, West Hurley, both of N.Y.

[73] Assignee: International Business Machines Corporation, Armonk, N.Y.

[22] Filed: Sept. 29, 1971

[21] Appl. No.: 293,751

[52] U.S. Cl............................ 321/5, 321/9 A, 307/66
[51] Int. Cl. ............................................ H02m 7/00
[58] Field of Search ............. 307/64, 66, 87; 321/9, 321/9 A, 5

[56] References Cited
UNITED STATES PATENTS 3,487,288  12/1969  Reid, Jr. et al. ................... 321/9 A
3,538,420  11/1970  Klein.................................. 321/9 A
3,599,007   8/1971  Martin, Jr. ............................. 307/87
3,614,461  10/1971  Speer et al......................... 307/66 X
3,614,590  10/1971  Kernick ............................. 321/9 A Primary Examiner—William M. Shoop, Jr.
Attorney, Agent, or Firm—Karl O. Hesse

[57] ABSTRACT

A multi-phase programmed pulse waveform generating inverter control system for controlling power switches to provide transient free electric power to a critical load in synchronism with a utility power source.

20 Claims, 8 Drawing Figures

PROGRAMMED WAVEFORM POWER INVERTER CONTROL SYSTEM

CROSS REFERENCE TO A RELATED APPLICATION

This application is related to copending application Ser. No. 293,707 of the same inventors, filed on the same date as the present application and assigned to the same assignee as the present application. The related application is hereby incorporated by reference into the present application.

BACKGROUND OF THE INVENTION

1. Field of the Invention

The present invention relates to electricity conversion systems in general and more particularly to conversion systems including means to introduce or eliminate frequency components. Even more specifically, the invention relates to programmed waveform generating inverter systems for converting DC to AC.

2. Description of the Prior Art

It is known in the field of power systems to provide emergency standby apparatus. Such emergency standby apparatus is connected to the input terminal of the critical load in place of the utility power source whenever there is an interruption in the utility power source. These prior art systems have several disadvantages. The first disadvantage is that it is virtually impossible to sense an impending utility power source interruption before it occurs and therefore some transient interruption of electric power to a critical load will occur before the emergency standby apparatus is activated. A second disadvantage of emergency standby apparatus is the inability to prevent transient variations in frequency or voltage caused by utility line faults which are automatically cleared by the utility company apparatus, or by the starting surges drawn when starting heavy motor loads from disrupting a critical load.

Digital to analog converters are also known in the prior art. These converters are known to provide analog voltage waveforms from digital inputs such as binary counts or modulated digital pulse trains and have been used to generate the sinusoidal waveforms at utility power source frequency that control emergency standby power inverter apparatus. Whenever plural phase emergency standby apparatus is required, a digital to analog converter has been provided for each phase to be generated and these converters were then operated in the appropriate phase relationship.

Various efforts have been described in the prior art to reduce the size and weight of inverter apparatus and output filter circuits by utilizing complex high frequency switching techniques. Examples of these switching techniques include amplitude summation methods and pulse modulation methods. In one example of amplitude summation, a bipolar pulse train at the fundamental frequency is summed with bipolar pulse trains at multiples of the fundamental frequency thereby generating a waveform composed of the fundamental and the required harmonics according to the principles of Fourier analysis. Another example of amplitude summation is the formation of several staggered phase pulse trains, all at the same frequency which is some multiple of the fundamental frequency. The staggered phase amplitude summation method is often used with multi-phase transformers thereby allowing unipolar switching devices to effectively generate bipolar pulse trains at the same time that amplitude summation is being accomplished. Examples of pulse modulation include pulse width modulation, pulse frequency modulation, pulse amplitude modulation and what has been called "picket-width" modulation.

A major disadvantage of amplitude summation methods is that relatively low pulse frequencies are involved which requires relatively large low frequency summing transformers. Likewise, the pulse width modulation teachings of the prior art tend to include some relatively lower frequency components as the pulse width is increased to provide peak waveform amplitude, again increasing the size of power transformers and filter inductors. Pulse frequency modulation teachings of the prior art utilize a relatively narrower pulse width thereby keeping frequency components high and transformers and inductor sizes small, however, pulse positions must be relatively close to generate peak waveform amplitude. Such close pulse spacing often calls for power switching devices having very high switching speeds. As a practical matter, devices capable of switching large amounts of power usually do not have high switching speeds and therefore pulse frequency modulation is usually limited in the prior art to applications using high speed transistor switches at relatively low power levels. Pulse amplitude modulation has the disadvantage of being more difficult to generate. The switching devices either must operate in class A mode, or some other method of obtaining the many amplitude levels must be provided such as a plurality of DC sources, a plurality of attenuators or a series of pulse summing transformers. Picket-width modulation overcomes the disadvantage of ordinary pulse width modulation in that lower frequency components are removed by breaking each pulse of predetermined pulse width up into a plurality of uniformly spaced picket voltage pulses. In most practical systems, a feedback signal is desired in order to compensate for output power variations caused by such factors as varying loads and varying power input potentials. It is towards this objective that the prior art teaching of picket-width modulation is directed. When pulses of predetermined pulse width are broken up into picket voltage pulses to remove low frequency components and each picket voltage pulse is in turn pulse width modulated to compensate for output power variations, it can be seen that higher speed switching devices will again be required in order to reduce the spacing between pickets as more power is required.

SUMMARY OF THE INVENTION

It is an object of this invention to provide continuous protection of a critical load from all electric power source variations and interruptions.

It is a further object of this invention to continuously provide transient free electric power to a critical load in synchronism with an electric utility power source to allow switching to the electric utility power source in the event that load currents in excess of inverter capacity are drawn by the load without causing transients at the critical load.

It is a still further object of the invention to generate waveforms using an improved pulse modulation technique.

It is an even further object of this invention to generate waveforms by an improved pulse modulation technique having the advantages of pulse width modulation and pulse frequency modulation without the disadvantages of requiring relatively larger transformers and inductors or relatively faster switching devices.

It is an even still further object of this invention to generate plural phase waveforms with a single wave shape control apparatus without the need to resort to delay lines, shift registers or counters to obtain the phase delays of the multi-phase output waveforms.

It is a more specific object of this invention to generate three-phase sinusoidal waveform electric power using a single counter and decoding circuit to simultaneously control the wave shape of all three phases.

It is a still more specific object of this invention to generate three-phase sinusoidal waveform electric power using a novel combination of pulse frequency and pulse width modulation to achieve the advantages of both without the disadvantages of either.

It is an even more specific object of this invention to generate three-phase sinusoidal waveform electric power under control of a single counter and decoding circuit which defines the position and width of voltage pulses generated by three separate switching circuits to generate the three-phase output waveforms.

The above objects are accomplished according to the present invention by generating a sequence of timing pulses in a counter. The timing pulses are decoded into a first sequence of integral modulated pulses having a first pulse width to define a relatively lower amplitude portion of a desired analog waveform. The timing pulses are also decoded into additional sequences of integral modulated pulses having pulse widths which are wider than the first pulse width to define relatively higher amplitude portions of the analog waveform. The repetition rate and width of each of the modulated pulses controls the amplitude of the analog waveform which is generated by integrating the sequences of modulated pulses in a filter. The timing pulses are encoded to generate the improved modulated pulses at a width and frequency so that the summation of area under the waveform to be generated is proportional at any point in time to the summation of areas of modulated pulses up to that same point in time. For this reason the improved modulation technique is called pulse integral modulation.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
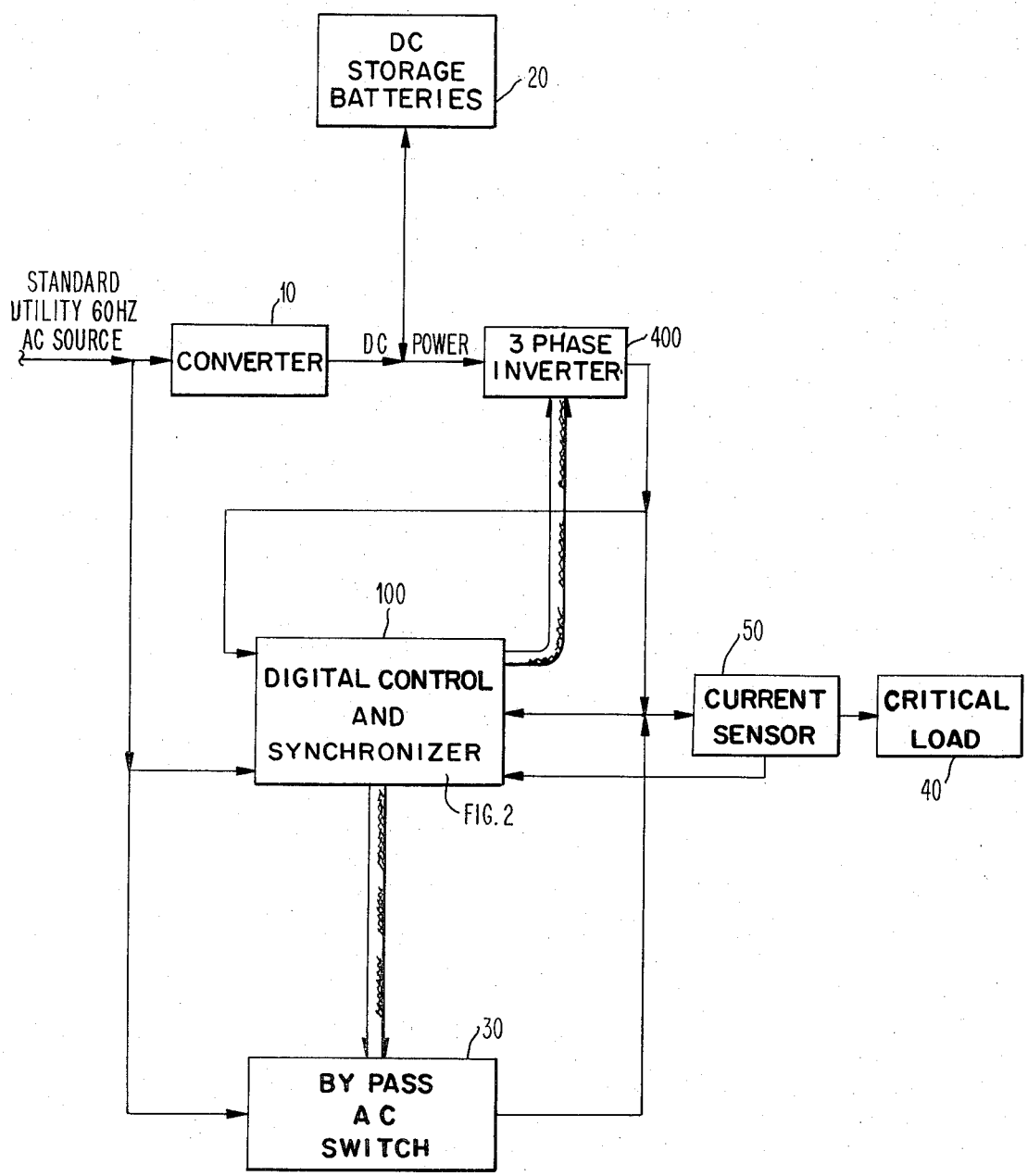
FIG. 1 shows an electrical energy conversion system wherein the invention finds utility.

Referring now to the drawings and more particularly to FIG. 1 thereof, an AC to DC to AC electrical power conversion system is shown for continuously providing transient-free electrical power to a critical load 40 in synchronism with an electric utility alternating current power source. Converter 10 is provided to convert the alternating current electric power received from the electric utility company to direct current power. Converter 10 may be any of a number of well known AC to DC power converters, including diode or rectifier bridges, or even a rotating machine. The DC output from converter 10 is connected to DC storage batteries 20 and to three-phase inverter 400. DC storage batteries 20 provide a reserve source of electrical energy to three-phase inverter 400 in the event that the electric utility power source is interrupted. The output of each inverter of three-phase inverter 400 is connected to a critical load 40 through current sensor 50. Current sensor 50 senses overcurrent or undercurrent conditions which may impair the operation of three-phase inverter 400. At least one phase output of three-phase inverter 400 is also connected to an input of digital control and synchronizer 100 to allow synchronization with a waveform of the electric utility power source.

In order to synchronize and control the shape of waveforms generated by three-phase inverter 400, digital control and synchronizer 100 is provided having a plurality of outputs connected to inputs of three-phase inverter 400. A plurality of outputs of digital control and synchronizer 100 are also connected to the control gates of each switch of bypass AC switch 300. The above recited pluralities of outputs are shown in more detail in FIGS. 2 and 5. Bypass AC switch 300 may comprise oppositely connected SCR switches or triac switches for connecting the electric utility power source to the critical load under any of a variety of conditions which may impair the operation of three-phase inverter 400.

Figure 2:
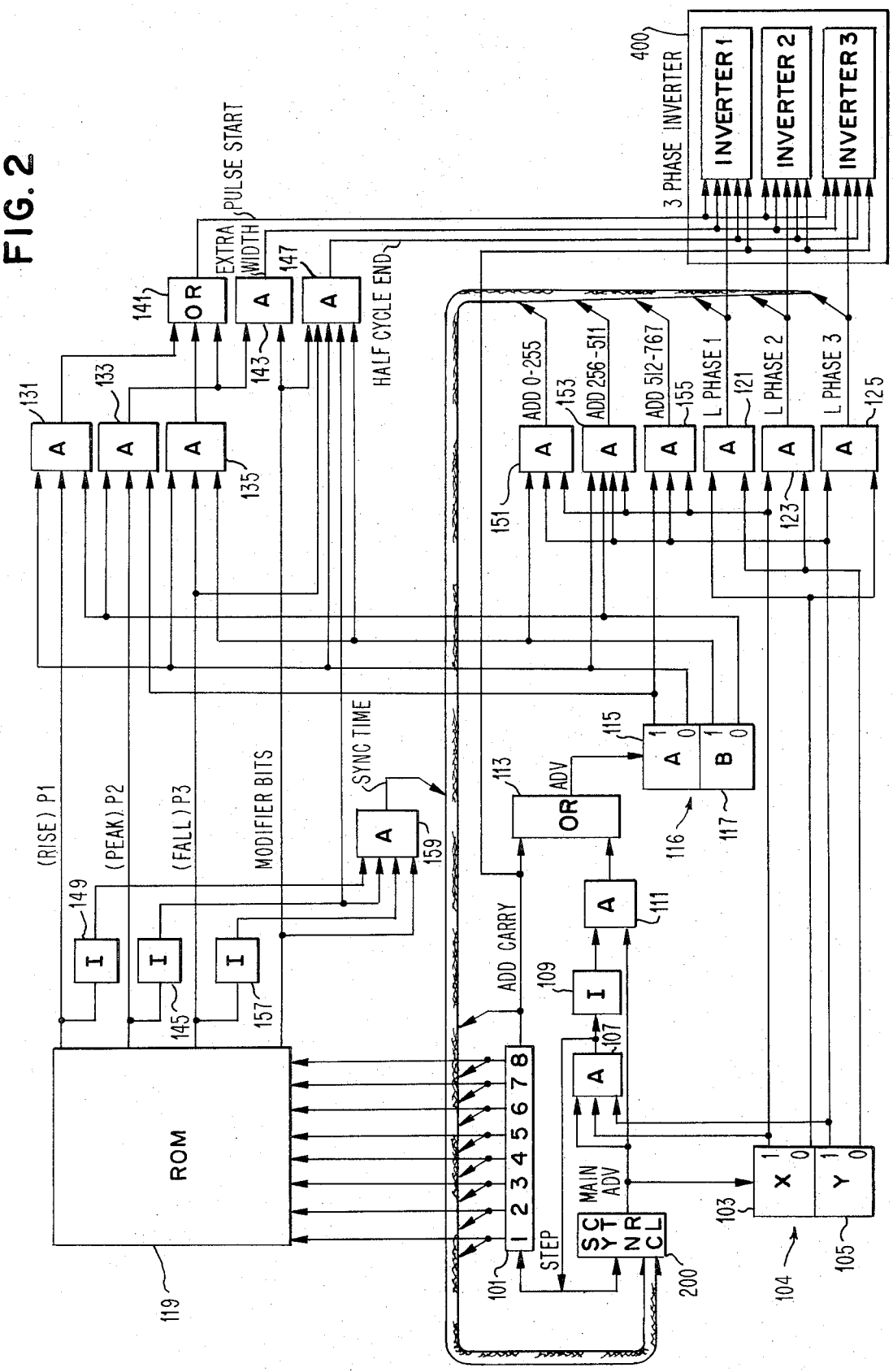
FIG. 2 shows the timing generator and decoding means for defining each portion of the waveforms being generated.

Attention is now drawn to FIG. 2 wherein a more detailed logic diagram of digital control and sychronizer 100 is shown. In order to repeatedly generate a sequence of timing pulses, a counter 101 is provided. Counter 101 has eight primary counting stages and counts from zero to 255. Each time counter 101 counts from zero to 255, a 60° portion of a cycle of a multiphase waveform is generated. Counter 101 is advanced by the output of AND gate 107 labeled STEP. AND gate 107 has a first input connected to the main advance output of sync control 200 labeled MAIN ADV as well as second and third inputs connected to the one outputs of XY counter stages 103, 105 respectively. The XY counter therefore inhibits AND gate 107 so that a STEP output is provided to coincide with every fourth main advance output received from sync control 200. The output of AND gate 107 is also connected to an input of AND gate 111 through inverter 109. A second input to AND gate 111 is connected to the main advance output of sync control 200. The output of AND gate 111 advances ternary connected counter stages 115 and 117 through OR gate 113 for each three main advance pulses which do not produce a sync pulse at the output of AND gate 107. Reflection upon the above description and the diagram of FIG. 2 will make it apparent that each four main advance pulses received from sync control 200 cause the two-stage binary XY counter 104 to roll over through its entire four counts, the two-stage ternary counter 116 to roll over to its entire three counts, and counter 101 to be advanced one count out of its possible 256 counts. When counter 101 is being advanced for the 256th time, an overflow output labeled ADD CARRY is provided to a second input of OR gate 113 to advance ternary counter 116 a fourth time corresponding to the fourth main advance pulse which is normally inhibited by AND gate 111. The overflow output of counter 101 causes the ternary counter 116 to increment one count with respect to the two-stage binary XY counter 104. After being incremented, binary XY counter 104 and ternary counter 116 will each roll over 256 times before being incremented again by the overflow output of counter 101.

In order to encode each sequence of 256 timing pulses into a plurality of modulated pulse sequences, an output from each stage of eight-stage binary counter 101 is connected to an input of read only memory 119. Because the embodiment being described is a three-phase waveform generator, three modulated pulse sequences labeled rise P1, peak P2, and fall P3 are provided at three outputs of read only memory 119. A fourth pulse sequence labeled MODIFIER BITS is also provided at a fourth output of read only memory 119. The modifier bit pulse sequence defines the width of energy pulses to be generated by the switching means of inverter 400. The P1, P2, and P3 sequences which define the repetition rate of the energy pulses generated by three-phase inverter 400 co-act with the modifier bits sequence to provide integral pulse modulated energy pulse sequences at the output of the inverters of three-phase inverter 400. Read only memory 119 is a 256-word memory wherein each word contains four bits. The existence of a binary one in any of the first three-bit positions indicates the start of a pulse of one of the modulated pulse sequences. The existence of a one in the fourth bit position concurrently with a one in the second bit position indicates the start of an extra wide energy pulse. The modifier bits are also used to define synchronizing and half-cycle switching times. The existence of a one in the fourth bit position coinciding with the absence of a one in the first, second and third bit positions indicates that the time between two main advance pulses can be lengthened or shortened to provide phase synchronizing adjustment. Likewise, the existence of a one in the fourth and third bit positions coinciding with the absence of a one in the second bit position while ternary counter 116 is providing an output count of 01 indicates that a half cycle of one of the waveforms of the multiphase waveform being generated is coming to an end.

In order to sequentially connect each of the three modulated pulse sequence outputs P1, P2, and P3 from the read only memory decoding means to the switches of three-phase inverter 400, a plurality of AND gates are provided. AND gate 131 has a first input connected to the P1 output of read only memory 119 corresponding to the first bit position of each memory word. AND gate 131 has second and third inputs connected to the OFF output of stages 115 and 117 respectively of ternary counter 116. AND gate 133 has a first input connected to the P2 output of read only memory 119 corresponding to the second bit position of each memory word. AND gate 133 has second and third inputs connected to the OFF output of stage 117 and the ON output of stage 115 of the ternary counter 116 respectively. AND gate 135 has a first input connected to the P3 output of read only memory 119 corresponding to the third bit position of each memory word. Second and third inputs of AND gate 135 are connected to the OFF output of stage 115 and the ON output of stage 117 of the ternary counter 116 respectively. The outputs of AND gates 131, 133 and 135 are connected to the three inputs of OR gate 141 which has an output connected to the pulse start inputs of all inverters of three-phase inverter 400. An AND gate 143 is also provided to initiate extra wide energy pulses from three-phase inverter 400 by sending a signal labeled extra width to each inverter of three-phase inverter 400. AND gate 143 has a first input connected to the output of AND gate 133 and a second input connected to the modifier bit output of read only memory 119 which corresponds to the fourth bit position of each memory word. AND gate 147 having a first input connected to the modifier bit output of read only memory 119, a second input connected to the P3 output of read only memory 119, a third output connected to the output of inverter 145, and fourth and fifth inputs connected to the off and on output of stages 115 and 117 of ternary counter 116 respectively. The output of AND gate 147 is connected to each inverter of three-phase inverter 400 to indicate that a half cycle of one of the phases of three-phase waveform is ending. In order to cause the switches of each inverter of three-phase inverter 400 to generate the proper portion of each of three three-phase waveforms being generated, AND gates 121, 123, and 125 generate line phase 1, line phase 2 and line phase 3 signals which are connected to inverter 1, inverter 2, and inverter 3 of three-phase inverter 400 respectively. AND gate 121 has first and second inputs connected to the zero outputs of stages 103 and 105 of the binary XY counter 104. AND gate 123 has first and second inputs connected to the one and zero outputs of stages 103 and 105 respectively of the binary XY counter 104. AND gate 126 has first and second inputs connected to the zero and one outputs of stages 103 and 105 of the binary XY counter 104 respectively. The beat frequency generated by ternary counter 116 and binary XY counter 104 as they are incremented with respect to each other by counter 101 and control gates 131 through 135 and 121 through 125 causes each inverter of three-phase inverter 400 to generate each of three different portions of a waveform in sequence.

In order to allow sync control 200 to synchronize the frequency of main advance pulses generated with a reference frequency, various signals indicative of the frequency and phase of the multiphase waveform being generated must be provided. To this end the output of each stage of binary counter 101, as well as signals labeled STEP, ADD CARRY, SYNC TIME, ADD 0–255, ADD 256–511, and ADD 512–767 are connected to sync control 200. The signal SYNC TIME is generated by AND gate 159 which has first, second and third inputs connected to outputs of inverters 149, 145, and 157 respectively. A fourth input of AND gate 159 is connected to the modifier bit output of read only memory 119. The input to inverters 149, 145 and 157 are connected to the P1, P2, and P3 outputs respectively of read only memory 119. AND gate 159 therefore provides a signal whenever a modifier bit is present without the presence of a pulse start bit in any of the pulse sequences P1, P2 or P3.

The signals labeled ADD 0–255, ADD 256–511, and ADD 512–767 are generated at the outputs of AND gates 151, 153, and 155 respectively. AND gate 151 has three inputs, a first connected to the one output of stage 117 of ternary counter 116, and second and third inputs connected to the one output of stages 103 and 105 of the binary XY counter. AND gate 153 has first and second inputs connected to the zero output of stages 115 and 117 of the ternary counter and third and fourth inputs connected to the one output of stages 103 and 105 of the binary XY counter. AND gate 155 has a first input connected to the one output of stage 115 of the ternary counter and second and third inputs connected to the one output of stages 103 and 105 of the binary XY counter.

Figure 4:
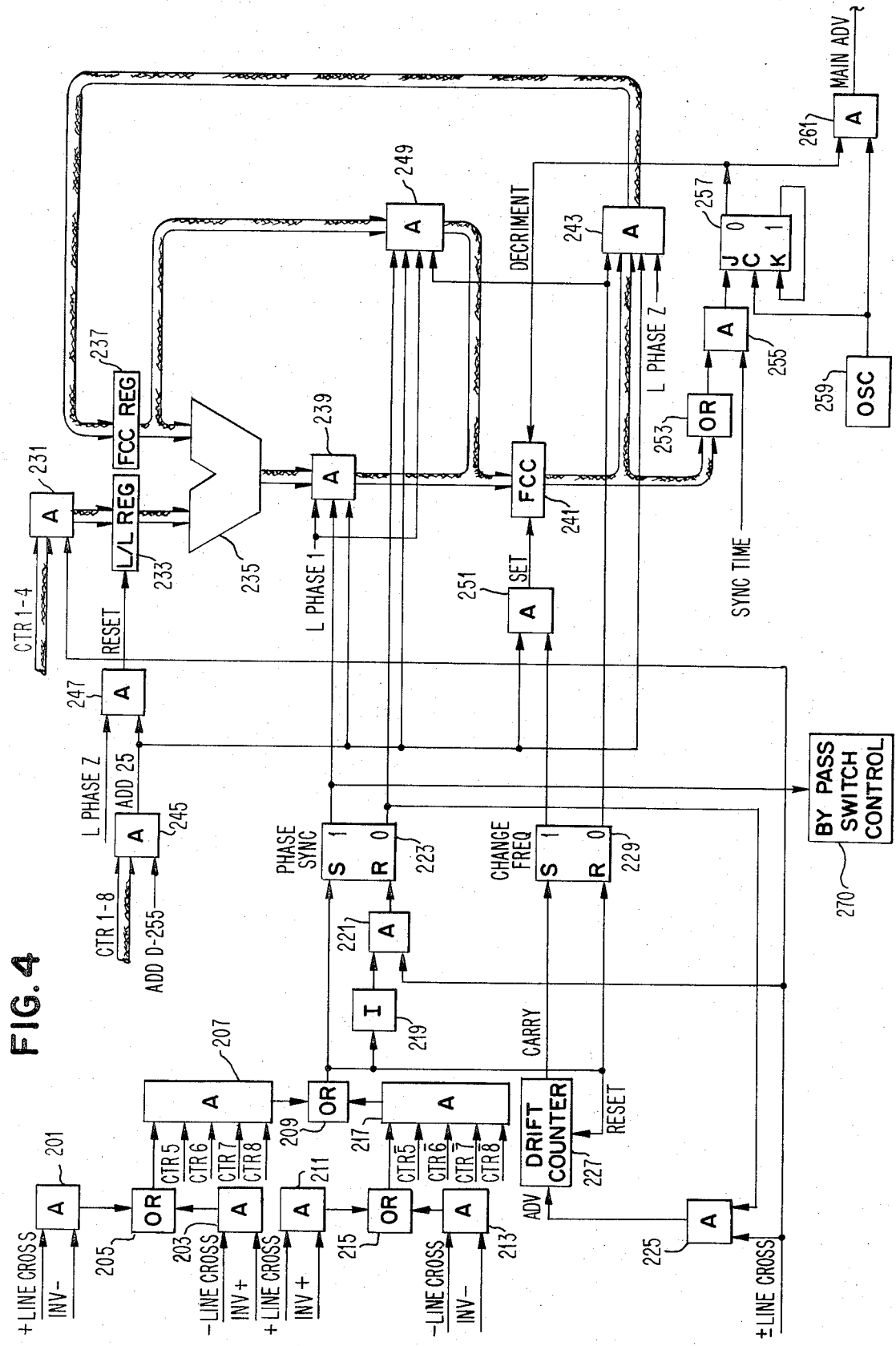
FIG. 4 shows the circuitry of sync control 200 of FIG. 2 in more detail.

Referring now to FIG. 4, a more detailed logic diagram is shown for synchronizing a waveform of the three-phase waveform being generated by three-phase inverter 400 with the 60 Hertz electric utility waveform. Synchronization is accomplished by changing the time between various pairs of main advance pulses thereby varying the rate at which the sequence of timing pulses generated by the binary and ternary counters is produced. The variation of the rate at which the sequence of timing pulses is produced is kept within predetermined limits as required by the critical load. The three-phase waveform generated by three-phase inverter 400 is allowed to drift out of synchronism with the electric utility waveforms whenever the electric utility waveforms are interrupted or change frequency in excess of a predetermined amount such as plus or minus one-half cycle per second. In order to provide main advance pulses, a 371712 Hertz oscillator 259 is provided. The output of oscillator 259 is connected to an input of AND gate 261 which has a second input connected to the zero output of JK flip-flop 257. Main advance pulses required by the circuit of FIG. 2 are provided at the output of AND gate 261. Flip-flop 257 has a C input connected to the output of oscillator 259 and K input connected back to a one output of flip-flop 257. AND gate 261, in conjunction with flip-flop 257, thus deletes a single oscillator pulse whenever flip-flop 257 is set by an enable output from AND gate 255. AND gate 255 has a first input connected to the output of AND gate 159 of FIG. 2 labeled SYNC TIME and a second input connected to the output of OR gate 253. OR gate 253 has an input connected to each stage of frequency control counter 241. OR gate 253 provides an output whenever a 1 bit exists in any stage of frequency control counter 241. Frequency control counter 241 is decremented every time a pulse is deleted under control of an inhibit signal at the output of flip-flop 257. In this manner the circuitry hereinabove described acts to delete oscillator pulses each time a sync time signal is received from AND gate 159 until the contents of frequency control counter 241 has been decremented to zero.

The number of oscillator pulses which must be deleted in order to keep the waveforms being generated by three-phase inverter 400 in synchronism with the electric utility waveforms are calculated by means of the logic circuits hereinafter described. Whenever a reference waveform of the electric utility power source crosses zero voltage, a ±line cross signal is generated which opens each of the four AND gates 231 to gate the contents of stages 1 through 4 of counter 101 into lead-lag register 233. The count thus stored in lead-lag register 233 is indicative of the number of STEP pulses which have occurred since the phase 1 waveform generated by three-phase inverter 400 crossed zero voltage if the waveforms being generated by three-phase inverter 400 are leading the electric utility. Likewise, the number stored in lead-lag register 233 is indicative of the number of STEP Pulses which will be required to advance counter 101 until the phase 1 waveform generated by three-phase inverter 400 crosses zero voltage in the event that the waveforms of three-phase inverter 400 are lagging the electric utility waveforms. Inasmuch as four main advance pulses are required for each STEP pulse, the contents of lead-lag register 233 must be multiplied by 4 in order to obtain the required change in number of oscillator pulses to be deleted to bring the respective waveforms into synchronism.

Multiplication by 4 in the binary number system can be accomplished by a shift of two places toward the most significant bit position. This shift of two places is accomplished in the instant embodiment by wiring the output of each stage of lead-lag register 233 to a second higher order input of adder 235. The second set of inputs to adder 235 is connected to respective stages of frequency control counter register 237. Frequency control counter register 237 contains the count of the number of oscillator pulses which had been deleted during the previous half cycle. Each output from adder 235 is connected to a first input of a different one of AND gates 239. Second, third and fourth inputs of each of AND gates 239 are connected to the line phase 1 output of AND gate 121, the one output of phase sync latch 223, and the address 25 output of AND gate 245 respectively. AND gates 239 transfer the output of adder 235 into frequency control counter 241 once during each half cycle. Immediately after being loaded, the contents of frequency control counter 241 is transferred through AND gates 243 into frequency control counter register 237 in preparation for calculation of the next delete count. To this end AND gates 243 each have a first input connected to a different stage of frequency control counter 241. AND gates 243 have second, third and fourth inputs connected to the zero output of change frequency latch 229, the address 25 output of AND gate 245, and the line phase 2 output of AND gates 123. In the event that the output of three-phase inverter 400 is determined to be in frequency synchronism but is not in phase synchronism with the electric utility referenced waveform, both phase sync latch 223 and change frequency latch 229 will be reset causing gate 239 to remain closed while gate 249 is allowed to open thereby transferring the previous frequency control count from register 237 into frequency control counter 241 without adding or subtracting from the previous delete count value. To this end, the output of each of the AND gates 249 is connected to an input to each stage of frequency control counter 241 while the output of each stage of frequency control register 237 is connected to a first input of each AND gates 249. Each AND gate 249 has second, third, fourth and fifth inputs connected to the zero output of phase sync latch 223, the address 25 output of AND gate 245 the line phase 1 output of AND gate 121, and the zero output of change frequency latch 229. The address 25 output of AND gate 245 is generated by decoding the contents of stages 1 through 8 of counter 101 received at the first eight inputs of AND gate 245 whenever the address 0-255 signal is received from AND gate 151 at a ninth input. The address 25 output of AND gate 245 is also connected to a second input of AND gate 247 which has a first input connected to the line phase 2 output of AND gate 123. The output of AND gate 247 resets lead-lag register 233 after its contents have been added to the contents of register 237 and gated to frequency control counter 241.

Figure 6:
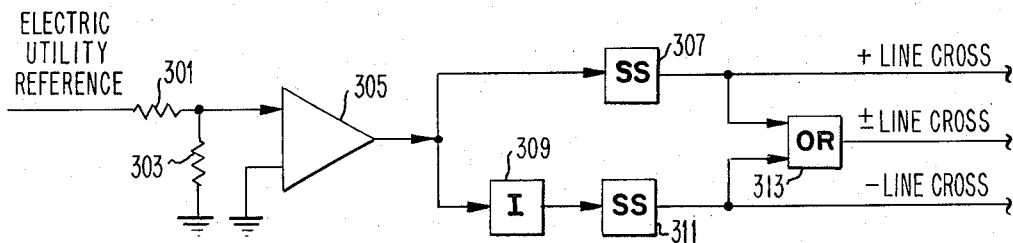
FIG. 6 illustrates typical circuitry for generating the +line cross, —line cross and ±line cross signals of FIG. 4.

In order to facilitate a better understanding of the remaining portions of FIG. 4 reference is now made to FIG. 6 wherein an example circuit as contained within sync control 200 is shown for detecting the voltage zero crossing parameters of an electric utility reference waveform. An input resistor 301 has a first terminal connected to an electric utility line for receiving a reference waveform. The second terminal of resistor 301 is connected to an input of voltage comparator 305 and to a terminal of resistor 303 which in turn has a second terminal connected to ground. Comparator 305 is also referenced to ground. Ground can be the neutral of the electric utility system. Resistors 301 and 303 form a voltage divider for reducing the electric utility line voltage to meet the input specifications of comparator 305. The output of comparator 305 is connected to single-shot 307 for producing a single pulse whenever the output of comparator 305 goes to a most positive level. The output of comparator 305 is also connected through inverter 309 to a second single-shot 311 for producing a pulse whenever the output of comparator 305 goes to a most negative level. The outputs of single-shots 307 and 311 are connected to inputs of OR gate 313 for providing a pulse whenever the output of comparator 305 goes positive or negative. The outputs of single-shot 307, single-shot 311, or OR gate 313 are labeled +line cross, −line cross, and ±line cross respectively.

Figure 7:
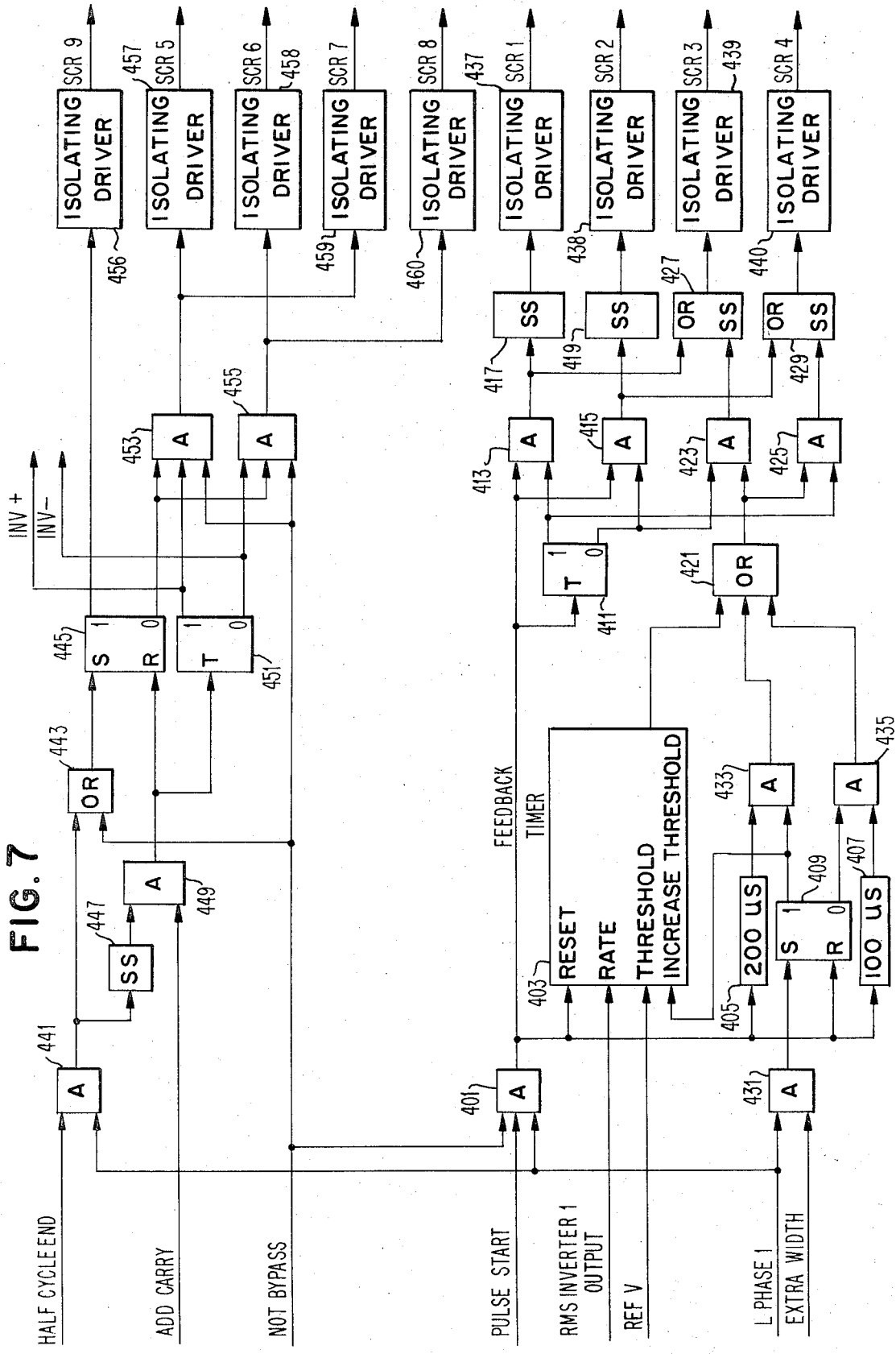
FIG. 7 is a logic diagram of the logic circuits of each inverter of three-phase inverter 400.

Referring once again to FIG. 4, the logic circuitry involved for determining whether or not the waveforms being generated by inverter 400 are in frequency and in phase synchronism with an electric utility reference waveform will be described. Choosing phase 1 of three-phase inverter 400 as the waveform to be synchronized with the electric utility reference waveform, a signal labeled INV− is received from inverter 1 whenever it is providing a negative output voltage and a signal labeled INV+ is received from inverter 1 whenever it is providing a positive voltage. The source of the INV− and INV+ signals is shown in FIG. 7. If the electric utility reference waveform is crossing from minus to plus and inverter 2 is providing a negative output, the two inputs to AND gate 201 of FIG. 4 are satisfied. Thereafter, AND gate 201 provides the signal to OR gate 205. In like manner, if the electric utility reference waveform is crossing from plus to minus and inverter 2 is providing a positive output voltage, the two inputs of AND gate 203 are satisfied causing AND gate 203 to provide an output to OR gate 205. The output of OR gate 205 indicates that the electric utility reference waveform is leading the phase 1 waveform of three-phase inverter 400. If the electric utility reference waveform is leading phase 1 inverter of three-phase inverter 400 by such a small amount that stages 5, 6, 7 and 8 of counter 101 all contain 1 bits, AND gate 207 having inputs connected to the aforementioned signals is opened thereby causing phase sync latch 223 to be set through OR gate 209. In like manner, AND gates 211 and 213 have outputs connected to OR gate 215 indicating that the voltage provided by inverter 1 of three-phase inverter 400 is leading the electric utility reference waveform. The output of OR gate 215 along with the zero output of each of counter stages 5, 6, 7 and 8 of counter 101 are connected to a second input of OR gate 209 which, in turn, sets phase sync latch 223. Thus phase sync latch 223 is set whenever the output of inverter 1 of three-phase inverter 400 is leading or lagging the electric utility reference waveform by less than 16 counts of counter 101. The output of OR gate 209 is also connected to an input of inverter 219, as well as to the reset inputs of drift counter 227 and change frequency latch 299. The output of inverter 219 is connected to an input of AND gate 221 which has a second input connected to ±line cross received from the output of OR gate 313. The output of AND gate 221 resets phase sync latch 233 whenever the electric utility reference waveform is crossing zero voltage unless the waveform being generated by inverter 1 of three-phase inverter 400 is simultaneously crossing zero as indicated by the inhibit output from inverter 219.

It is comtemplated that during the operation of the instant invention, there may be an interruption in the electric utility reference waveform. Upon such an event, inverter 400 will continue to operate at the same frequency inasmuch as lead-lag register 233 having been reset by AND gate 247 will call for zero change in the number of oscillator pulses to be deleted and the same number of oscillator pulses will therefore be deleted each half cycle. When the electric utility reference waveform is restored, there is a high likelihood that it will be restored at the same frequency but may have drifted into a substantial lead or lag phase error relationship with respect to the waveform at the output of inverter 1 of three-phase inverter 400. The first ±line cross signal received from the circuit of FIG. 6 after the electric utility reference waveform has been restored will condition a first input to AND gate 225. The second input to AND gate 225 is conditioned by the zero output of phase sync latch 223 which will be reset because no outputs are received from OR gate 209 whenever the waveform from inverter 1 of three-phase inverter 400 leads or lags the electric utility reference waveform by more than 16 counts of counter 101. Thus AND gate 225 will provide an output to advance drift counter 227 each time the electric utility reference waveform crosses zero voltage. Drift counter 227 contains nine stages thereby allowing inverter 400 to continue to operate at the same frequency for 512 half cycles. If the frequency of the electric utility reference waveform is exactly equal to the frequency of the waveform from inverter 1 of three-phase inverter 400, they will never drift into phase synchronism and eventually a carry output will be received from drift counter 227.

In the event that the frequency of the electric utility reference waveform is not exactly equal to the frequency of the waveform generated by inverter 1 of three-phase inverter 400, the waveforms of inverter 400 will drift into a phase lead or lag relationship with electric utility reference waveform of less than 16 counts of counter 101. Upon phase synchronism within 16 counts of counter 101, an output will be generated by OR gate 209 which will set phase sync latch 223 and reset drift counter 227 prior to a carry being generated.

As heretofore described, in the event that the frequency of the electric utility waveform is exactly equal to the frequency of inverter 400, there will be no phase drift and eventually this counter 227 will provide a carry output to set change frequency latch 229. The one output of change frequency latch 229 is connected to a first input of AND gate 251. AND gate 251 has a second input connected to the address 25 output of AND gate 245. AND gate 251 sets a one in each stage of frequency control counter 241 so that a maximum number of oscillator pulses are deleted during each half cycle in order to operate three-phase inverter 400 at a lowest frequency. Note that AND gates 243 are inhibited whenever the zero output of change frequency latch 229 is not enabled and therefore the all ones condition of frequency control counter 241 will not be transferred to frequency control register 237 and therefore the original count will be retained therein to allow return to the previous operating frequency as soon as phase synchronism is achieved.

In order to allow bypass control switch 270 to connect critical load 40 directly to the electric utility whenever necessary without causing excessive transients, the one output of phase sync latch 223 is connected to the bypass switch control circuit 270. By virtue of the abovementioned connection, the bypass switches can only close when the waveforms of three-phase inverter 400 are leading or lagging the electric utility waveforms by less than 16 counts of counter 101 which corresponds to approximately 4°.

Figure 5:
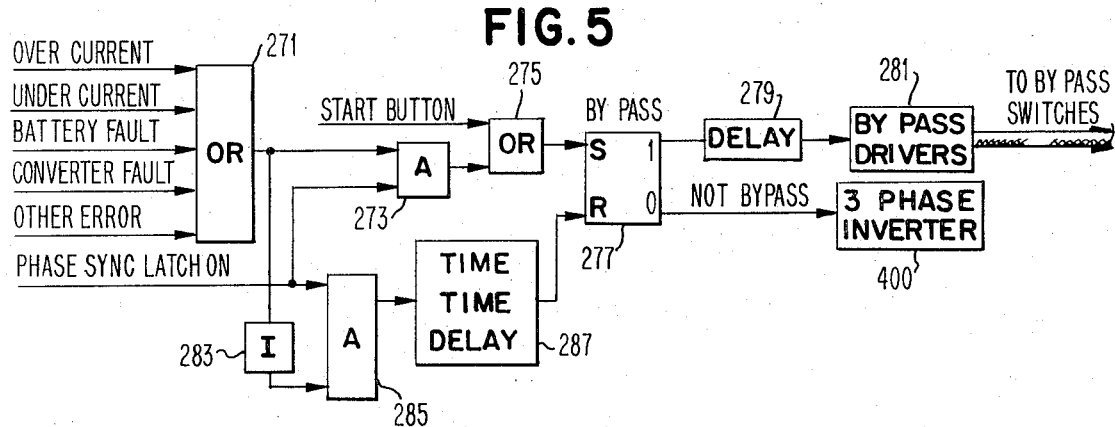
FIG. 5 is a logic diagram of those circuits of digital control and synchronizer 100 which drive bypass AC switch 30 as shown in FIG. 1.

Referring now to FIG. 5, a logic diagram of the circuitry of bypass switch control 270 is shown. OR gate 271 having inputs from various sensors within the system shown in FIG. 1 provides an output upon occurrence of the identified conditions such as over-current, under-current, battery faults, converter faults, other error and so forth. The output of OR gate 271 is connected to a first input of AND gate 273. AND gate 273 has a second input connected to the one output of phase sync latch 223 so that AND gate 273 is enabled whenever the waveforms generated by three-phase inverter 400 are leading or lagging the electric utility waveforms by less than approximately 4°. The output of AND gate 273 is connected to an input of OR gate 275 which in turn has an output connected to the set input of bypass latch 277. Bypass latch 277 is also set by the start button so that initial surge currents drawn by a critical load during start-up are provided directly by the electric utility and do not overload three-phase inverter 400. The one output of bypass latch 277 is connected through delay circuit 279 to each of the bypass drivers to close bypass switches 300 shown in FIG. 1. Bypass latch 277 is reset by the output of time delay 287. Time delay 287 begins to measure time upon being energized by the output from AND gate 285. AND gate 285 has a first input connected to the one output of phase sync latch 223 and a second input connected through inverter 283 to the output of OR gate 271. AND gate 285 provides an output when phase sync latch 223 is active and none of the conditions detected by OR gate 271 are present. The zero output of bypass latch 277 is connected to three-phase inverter 400 to activate the power switches of three-phase inverter 400 whenever the bypass switches are inactivated.

Figure 8:
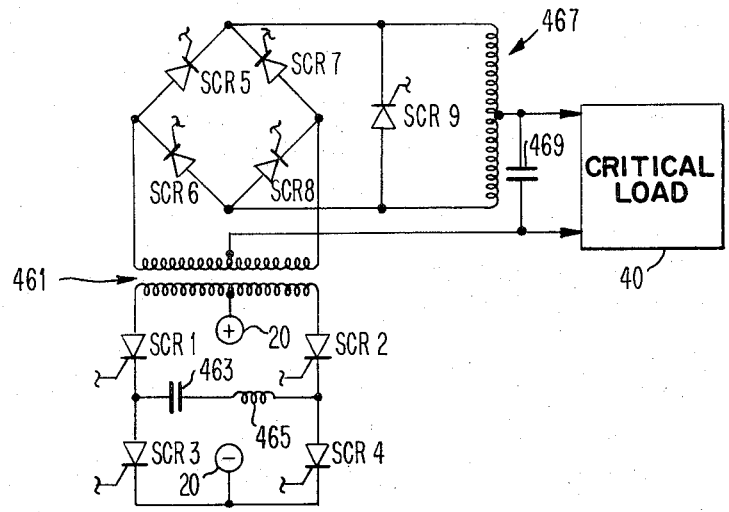
FIG. 8 is a circuit diagram of the power switch of each inverter of three-phase inverter 400.

Attention is now drawn to FIG. 8 wherein a switching circuit such as contained within each inverter of three-phase inverter 400 is shown. In order to provide the proper voltage transformation as DC voltage is inverted to AC voltage, a transformer 461 having center-tapped primary and center-tapped secondary windings is provided. The primary center tap is connected to the positive terminal of the DC power source such as DC storage battery 20. One end of the primary winding is connected through SCR 1 and SCR 3 in series to the negative terminal of the DC power source. In like manner, the other end of the primary winding of transformer 461 is connected through SCR 2 and SCR 4 in series to the negative terminal of the DC power source. SCRs 1, 3 and SCRs 2, 4 are alternately rendered conducting by control signals received from inverter logic of FIG. 7 to generate energy pulses in the secondary winding of transformer 461. SCR 1 and SCR 2 are rendered nonconducting by the commutate action of SCR 4 and SCR 3 respectively. Commutate current is drawn through series connected capacitor 463 and inductor 465 which provides a path between the anode of SCR 3 and anode of SCR 4. The gates of SCR 3 and SCR 4 are likewise controlled for commutate action by signals from the inverter logic shown in FIG. 7.

The center tap of the secondary winding of transformer 461 is connected to critical load 40 to provide a return current path. Each end of the secondary winding of transformer 461 is connected to an AC input node of a full wave SCR bridge comprising SCRs 5, 6, 7 and 8. The DC positive output node of the SCR rectifier bridge is connected to the cathode of SCR 9 and a first end terminal of center-tapped choke 467. The negative output node of the SCR bridge is connected to the anode of SCR 9 and also to the second end of the center-tapped winding of choke 467. The center tap of choke 467 is connected to a power input terminal of critical load 40 for receiving filtered, transient-free, alternating current power. Additional filtering is provided at the output of choke 467 by capacitor 469 which has a first terminal connected to the center tap of choke 467 and a second terminal connected to the center tap of 461. SCRs 5 through 9 each have a gate terminal connected to the logic circuit of FIG. 7 for controlling their conductivity so as to convert the sequence of alternating polarity energy pulses received from transformer 461 into sequences of positive pulses and sequences of negative pulses which are filtered by choke 467 and capacitor 469 to provide positive half cycles and negative half cycles respectively at the output of the inverter. SCR 9 remains nonconducting during each positive and each negative half cycle and is rendered conducting only for a brief period during which the output voltage of the inverter crosses zero voltage. SCR 9 acts as a clamp on inductor 467 to allow a first pair of opposite arms of the SCR bridge to turn off before the other pair of arms turn on. SCR 9 thereby prevents all four arms of the SCR bridge from being rendered conductive simultaneously which would short out transformer 461 and thereby present a destructive fault condition.

Referring now to FIG. 7, the logic circuitry for controlling SCR 1 through SCR 9 in response to the modulated pulse sequences and other signals received from digital control and synchronizer 100 will be described. Each SCR 1 through SCR 9 has a gate connected to an isolating driver circuit 437, 438, 439, 440, 457, 458, 459, 460 and 456 respectively. Each of the above recited isolating driver circuits has a reference connection to the cathode of its respective SCR so that gate-to-cathode currents can be imparted to each SCR to render each SCR conductive. Each of the above recited isolating driver circuits may be any of a number of well known SCR driving circuits such as pulse transformers, optically coupled light-emitting and light-sensitive semi-conductor devices, small floating DC supply circuits and so forth.

Each time an energy pulse is to be generated by the switching SCRs of an inverter circuit, a pulse start signal is received by AND gate 401 from the output of OR gate 141. AND gate 401 has a second input connected to the output of AND gate 121 for receiving a line phase 1 signal. The line phase 1 signal will not be active when the pulse start signal received at AND gate 401 is intended to cause the switches of phase 2 or phase 3 inverters to provide energy pulses. AND gate 401 has a third input for receiving a not bypass signal from the zero output of bypass flip-flop 277. The output of AND gate 401 is connected to first inputs of AND gates 413 and 415 as well as the toggle input of flip-flop 411. Successive pairs of output pulses from AND gate 401 set and reset toggle flip-flop 411 respectively causing AND gates 413 and 415 to be alternately enabled by virtue of their second inputs which are connected to the one and zero outputs of toggle flip-flop 411 respectively. The outputs of AND gates 413 and 415 are connected through single-shot circuits 417 and 419 to isolating drivers 437 and 438 respectively to alternately render SCR 1 and SCR 2 conductive respectively. The outputs of AND gates 413 and 415 are also connected to OR inputs of single-shot circuits 427 and 429 which in turn activate isolating driver circuits 439 and 440 to render SCR 3 and SCR 4 conductive at the same time that SCR 1 and SCR 2 are turned on respectively. SCR 1 and SCR 3 or alternately SCR 2 and SCR 4 thereby provide a series path for primary current through previously described transformer 461 to generate an energy pulse.

In addition to providing a series path, SCR 3 and SCR 4 act as commutating devices to turn each other off through commutate capacitor and inductor 463 and 465 respectively. The maximum width of each energy pulse is controlled by delay circuits 405 and 407, acting through AND gates 433 and 435 and OR gate 421. First inputs of AND gates 433 and 435 are connected to output of delay circuits 405 and 407. AND gate 435 has a second input connected to the zero output of latch 409. Delay 407 with AND gate 435 thus provide a pulse end signal 100 microseconds after a pulse start signal is received. Latch 409 is reset by the output of AND gate 401 and is set by the output of AND gate 431. AND gate 431 has a first input connected to line phase 1 output of AND gate 121 and a second input connected to extra width output of AND gate 143. Latch 409 is therefore set whenever extra wide energy pulses are required such as at the peak of the waveform being generated. In like manner, AND gate 433 has a second input connected to the one output of latch 409. AND gate 433 in conjunction with delay 405 therefore provides a pulse end signal 200 microseconds after each pulse start signal whenever latch 409 is set. The pulse end output signals from AND gates 433 and 435 are connected to first and second inputs of OR gate 421.

The width of each pulse is further controlled by Feedback Timer 403 to be of a width less than the maximum widths set by delay circuits 405 and 407 whenever less than a maximum power output is being provided. Timer 403 can be a digital counter driven by a voltage controlled oscillator or it can be an analog ramp generator driven by a variable rate current source. Timer 403 has a reset input connected to the output of AND gate 401 for resetting the timer to zero whenever an energy pulse is started. Timer 403 also has a rate input for receiving an analog voltage proportional to the RMS average or peak voltage output of the inverter. The frequency of the voltage controlled oscillator or alternately the current provided by the previously described current generator of timer 403 is controlled by the magnitude of the voltage received at the rate input to be directly proportional thereto. Timer 403 also has a threshold input for receiving a reference voltage proportional to the RMS output voltage desired from inverter 1. The one output of latch 409 is also connected to an increase threshold input of timer 403. Whenever latch 409 is set, the threshold at which an output is generated by timer 403 is increased to allow a wider energy pulse. The magnitude of the voltage at the threshold input of timer 403 defines the threshold count or ramp voltage at which an output is provided from timer 403. In this manner the width of the energy pulses generated by the SCR switches is controlled to be inversely proportional to the change in amplitude of the waveform being generated. The output of timer 403 is connected to a third input of OR gate 421 which has an output connected to first inputs of AND gates 423 and 425. Second inputs of AND gates 423 and 425 are connected to zero and one output of toggle flip-flop 411 respectively. The output of each of AND gates 423 and 425 is connected to a second OR inputs of single-shots 427 and 429 respectively. By virtue of the circuitry described directly above, SCR 4 can be turned on by an output from timer 403 while SCRs 1 and 3 are conducting to cause SCR 3 to turn off which in turn will cause SCR 1 to turn off thereby terminating the energy pulse provided by transformer 461.

The logic circuits for controlling SCR 5 through SCR 9 to convert the alternating polarity energy pulses received from transformer 461 into inverter output waveform half cycles will now be described. In order to cause the SCR bridge in FIG. 8 to generate positive half cycles, the output of AND gate 453 is connected to isolating driver 457 as well as isolating driver 459 to cause SCR 5 and SCR 7 to conduct whenever a positive voltage appears on their anode with respect to their cathode. In like manner, AND gate 455 has an output connected to the inputs of isolating driver 458 and isolating driver 460 in order to cause the SCR bridge to generate a negative half cycle. AND gates 453 and 455 each have a first input connected to the zero output of crossover latch 445 as well as second input connected to the zero output of bypass latch 277. AND gates 453 and 455 are thereby inhibited whenever crossover latch 445 or bypass latch 277 is set. AND gates 453 and 455 have third inputs connected to the one and the zero outputs of toggle flip-flop 451 respectively. Thus AND gates 453 and 455 are alternately rendered active as toggle flip-flop 451 is set and reset respectively.

In order to control the proper operation of SCR 9 and to switch toggle flip-flop 451, the following logic circuitry is provided to determine the end of each half cycle of the waveform generated by inverter 1. At the end of each sequence of timing pulses, a half-cycle end signal is provided at the output of AND gate 147 which is connected to a first input of AND gate 441. A second input of AND gate 441 is connected to the line phase 1 output of AND gate 121. The output of AND gate 441 is connected to a first input of OR gate 443 and to the input of single-shot 447. The output of OR gate 443 is connected to a set input of crossover latch 445. The one output of crossover latch 445 is connected to the input of isolating driver 456 for activating SCR 9 just prior to actual zero crossover of voltage provided at the output of the inverter. Actual zero voltage crossover is to occur when an address carry signal is received from counter 101 at a second input of AND gate 449. A first input of AND gate 449 receives an output from single-shot 447 which has delayed the half-cycle end signal received through AND gate 441. The output of AND gate 449 is connected to the reset input of crossover latch 445 and to the toggle input of toggle flip-flop 451. AND gate 449 thus turns off isolating driver 459 to allow SCR 9 to become nonconducting when positive voltage is no longer present at its anode and also flips toggle flip-flop 451 so that the SCR bridge is controlled to generate the next half cycle of opposite polarity at the output of the inverter.

OPERATION OF THE PREFERRED EMBODIMENT

Figure 3:
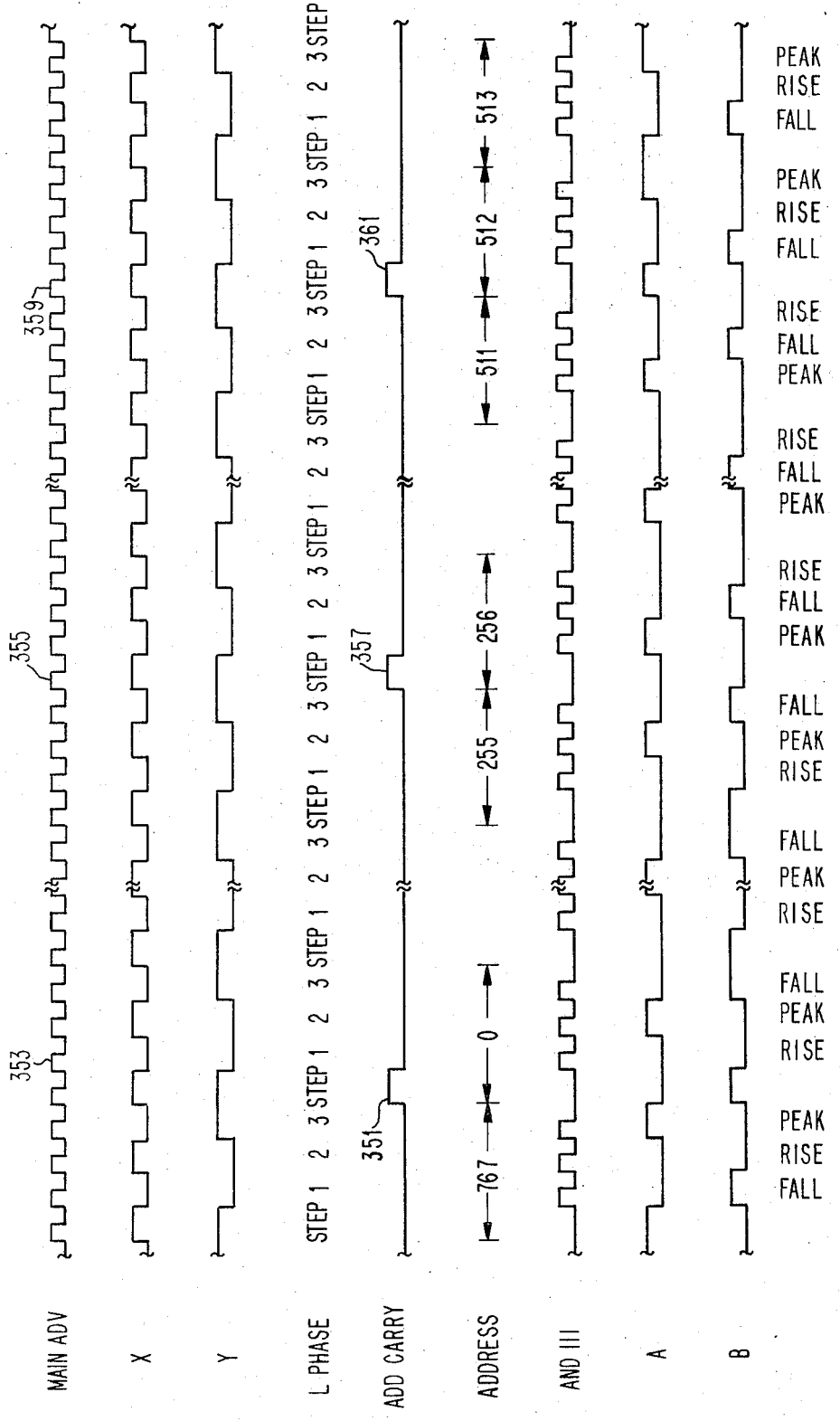
FIG. 3 is a timing diagram portraying the sequence of some of the signals generated by the circuits of FIG. 2.

In order to assist in a better understanding of the operation of the circuitry of FIG. 2, attention is directed to the timing chart of FIG. 3. The first waveform labeled MAIN ADV corresponds to the output of AND gate 261 which provides main advance pulses corresponding to each oscillator pulse except for those instances when oscillator pulses are deleted to maintain proper frequency. The second waveforms labeled X and Y correspond to the outputs of stages 103 and 105 of binary counter 104. The fourth row of FIG. 3 identifies the line phases which the decoded output of the X and Y counting stages define. For example, whenever both X and Y are one, counter 101 is advanced one count by the step pulse from AND gate 107. When both X and Y are zero, the decoded outputs of read only memory 119 is gated to the phase 1 inverter of three-phase inverter 400. When X is one and Y is zero the decoded outputs of read only memory 119 is gated to inverter 2 of three-phase inverter 400 and when X is zero and Y is one, the decoded outputs of read only memory 119 is connected to inverter 3 of three-phase inverter 400.

The fifth waveform of FIG. 3 labeled ADD CARRY corresponds to the overflow or carry output from counter 101 indicating that counter 101 has counted through 256 increments. Two hundred fifty six increments of counter 101 corresponds to 60° of a sinusoidal waveform. Thus a single sequence of timing pulses corresponds to 60° out of 180° of a full half cycle and the sequence of timing pulses generated by counter 101 must be repeated three times to generate a full half cycle. The timing pulses generated by counter 101 are decoded by read only memory 119 and the logic circuitry including AND gates 131, 133 and 135 into a plurality of modulated pulse sequences. Pulses of each sequence are interleaved in time between pulses of other sequences under control of ternary counter 116. As ternary counter 116 is advanced by the output of AND gate 111, or by the ADD CARRY pulse whenever it occurs, the stages 115 and 117, labeled A and B respectively, generate the last two waveforms shown in FIG. 3 and labeled A and B. The XY counter 104 and ternary counter 116 coact to connect each pulse sequence from read only memory 119 to a different phase inverter of three-phase inverter 400 for each sequence of timing pulses and incrementing the connections so that each different inverter is connected to a next pulse sequence. For example, consider the pulse sequence starting with address 0 which corresponds to 0° of the waveform generated by inverter 1. Main advance pulse 353 immediately following ADD CARRY pulse 351 advances XY counter 104 to line phase 1 and advances ternary counter 116 so that a start pulse generated in response to a rise bit from sequence P1 is connected to inverter 1 of threephase inverter 400. The next main advance pulse advances both counters 104 and 116 so that a start pulse corresponding to a bit from sequence P2, defining the peak portion of the waveform, is connected to inverter 2 of three-phase inverter 400. In like manner, the third main advance pulse causes a start pulse generated in response to a bit from the fall sequence P3 to be connected to inverter 3 of three-phase inverter 400. Counters 104 and 116 will continue to operate in the above described manner for 254 additional rotations, each time connecting bits from the rising pulse sequence P1 to inverter 1, bits from the peak pulse sequence P2 to inverter 2, and bits from the fall pulse sequence P3 to inverter 3. In order to control the frequency of the 60° portion of the waveforms being generated, several main advance pulses will be deleted, one at a time at scattered positions throughout the 1,024 main advance pulses that will be received for each sequence of timing pulses between ADD CARRY pulses. Pulse deletion for synchronizing purposes is not shown in FIG. 3 to avoid causing confusion. However, whenever a pulse is deleted, neither counter 104 or counter 116 advances so their operation is not affected with the exception of the introduced time delay.

In order to facilitate a more clear understanding of how each succeeeding sequence of timing pulses reconnects pulse sequences to switching circuits, attention is drawn to main advance pulse 355 which causes the next sequence of timing pulses to be generated corresponding to a 60° point on the phase 1 waveform being generated by inverter 1.

In order to generate the proper wave shape for the next 60° corresponding to the peak portion of the phase 1 waveform being generated by inverter 1, start pulses from the peak pulse sequence P2 must be connected to inverter 1. This is accomplished by incrementing ternary counter 116 one additional count by virtue of the ADD CARRY output from counter 101. The timing sequence now being generated is labeled address 256–511. During this sequence of timing pulses, start pulses generated from the peak, fall and rise bit sequences P2, P3 and P1 are connected to inverter 1, inverter 2 and inverter 3 of three-phase inverter 400 respectively each time counter 101 is advanced. In this manner a 60° portion of all three waveforms is generated, the phase 1 portion being the 60° to 120° peak portion. In like manner, main advance pulse 359 initiates the third sequence of timing pulses and causes ADD CARRY pulse 361 to again increment ternary counter 116 with respect to binary XY counter 104. Thus during the third sequence of timing pulses corresponding to address 512 through address 767, start pulses corresponding to the fall, rise and peak sequences P3, P1 and P2 are connected to inverter 1, inverter 2 and inverter 3 of three-phase inverter 400 respectively. At the end of the third sequence of timing pulses, main advance pulse 353 reoccurs generating ADD CARRY pulse 351 and again incrementing ternary AB counter with respect to binary XY counter so that start pulses corresponding to rise, peak and fall sequences P1, P2 and P3 are again connected to inverter 1, inverter 2 and inverter 3 of three-phase inverter 400 respectively. The above described connection steps continue indefinitely to generate each half cycle of each phase of the three-phase waveforms in their proper phase relationship with respect to each other.

Referring again to FIG. 1, the overall operation of the inverter system will be described. Power is received at the input of converter 10 from an electric utility 60 Hertz alternating current source. Converter 10 converts the alternating current into direct current power to charge DC storage battery 20 and provides DC power input to three-phase inverter 400. As power is being applied for the first time to critical load 40, bypass AC switch 300 is closed so that inrush currents to the load are provided by the electric utility source and do not overload three-phase inverter 400. Although the controlled rectifier switches of three-phase inverter 400 are not operative during this start-up period, digital control and synchronizer 100 is operating and sync control 200 of FIG. 4 is adjusting the number of main advance pluses to bring the modulated pulse sequences being generated by control 100 into frequency and phase synchronism with the electric utility alternating current source. When frequency and phase synchronism is achieved, phase sync latch 223 will be set and time delay 287 of the bypass control logic will begin to time out. If the waveforms being generated by the digital control logic remain in synchronism for the time period of time delay 287, bypass latch 277 is reset allowing the controlled rectifier switches of three-phase inverter 400 to become conductive under control of digital control 100. Bypass AC switch 300 is then opened removing the electric utility alternating current source from the critical load.

Bypass AC switch 300 can be reclosed at any time so long as phase sync latch 223 remains set if an overload current is sensed by current sensor 50 or some other fault condition is detected such as low battery voltage etc.

While the invention has been particularly shown and described with reference to a preferred embodiment thereof, it will be understood by those skilled in the art that various changes in form and detail may be made without departing from the spirit and scope of the invention. For example, the read only memory 119 may, within the skill of the art, be replaced with a read/write memory or with standard AND/OR gate logic circuits to generate the modulated pulse sequences at the proper times. Furthermore, although the switches of three-phase inverter 400 are shown as a novel controlled rectifier switching circuit claimed in copending application serial number 293,707, the programmed pulse waveform generating means of the instant invention will operate as well with other switching means including a simple pair of transistor switches driving a load from positive and negative polarity DC sources.

What is claimed is:

1. A method of generating multi-phase waveforms comprising the steps of:
    1. generating a sequence of timing pulses;
    2. encoding said sequence of timing pulses into a plurality of modulated pulse sequences P1 through PN, the modulation of each sequence P1 through PN defining a different portion of a cycle of a waveform of said multi-phase waveforms;
    3. connecting sequences P1 through PN to corresponding switching circuits S1 through SN respectively, each of said switching circuits S1 through SN providing an energy pulse to integrating means whenever a pulse of a connected pulse sequence of said sequences P1 through PN is received, thereby each of said switches in cooperation with its connected modulated pulse sequence generating a different portion of a waveform of said multi-phase waveforms;
    4. precessing the relationship of said modulated pulse sequences to said switches by repeating step 1 and step 2 and reconnecting said modulated pulse sequences to said switching circuits so that said sequences P2 through PN, P1 are connected to said switching circuits S1 through SN respectively whereby each switching circuit is controlled by a next sequence of modulated pulses thereby continuing to generate next successive portions of each cycle of each of said multi-phase waveforms.

2. The method of claim 1 comprising the steps of:
changing said energy pulses provided by one switch $Si$ of said switches S1 through SN to be of opposite potential each time said sequence P1 is connected to control said switch $Si$, thereby generating an alternating potential waveform having negative and positive half cycles.

3. The method of claim 2 further comprising the steps of:
controlling the energy of said energy pulses from each of said switches S1 through SN by varying the width of said energy pulses by an amount inversely proportioned to the change in amplitude of said generated waveform thereby providing amplitude regulation, to compensate for variations of the source potential and variations of the impedance of a load being driven by said generated waveform.

4. The method of claim 2 further comprising the step of:
varying within predetermined limits the rate at which said sequence of timing pulses is generated to maintain a generated waveform of said generated multi-phase waveforms in frequency and phase synchronism with a reference waveform as long as said reference waveform remains within a frequency range proportional to said predetermined limits.

5. The method of claim 4 wherein said reference waveform is a power source waveform and further comprising the step of:
switching a load from said waveform of said generated multi-phase waveforms to said power source waveform when said impedance of said load drops to a value which allows more than a predetermined amount of power to flow through said switch if said generated waveform is in synchronism with said power source waveform.

6. A multi-phase waveform generator comprising:

a timing generator for repeatedly generating a sequence of timing pulses;

encoding means connected to said timing generator for encoding said sequence of timing pulses into a plurality of modulated pulse sequences P1 through PN at a corresponding plurality of outputs, the modulation of each of said sequences P1 through PN defining a different portion of a cycle of a waveform of multi-phase waveforms;

a plurality of switching means S1 through SN, each of said switching means having an input and including integrating means at an output for providing a waveform which is the integral of energy pulses generated within said switching means in response to pulses of a connected one of said modulated pulse sequences from said encoding means;

gating means connected to and actuated by said timing generator for connecting each of said outputs of said encoding means to said input of a corresponding one of said switching means S1 through SN respectively causing each of said switches to generate a different portion of a different waveform of said multi-phase waveforms, said gating means incrementing each time said sequence of timing pulses is repeated so that said input of each of said switches is reconnected to an output of said encoding means corresponding to a next of said modulated pulse sequences so that said switch SN is connected to an output of said encoding means which was just previously connected to said switch S1 whereby said switch SN continues to generate successive portions of a waveform of said multi-phase waveforms.

7. The multi-phase waveform generator of claim 6 wherein each of said switches further comprises means for generating energy pulses of positive potential and energy pulses of negative potential, said means being controlled by said gating means to provide energy pulses of opposite potential each time said output corresponding to said modulated pulse sequence P1 is connected to said switch.

8. The multi-phase waveform generator of claim 7 wherein each of said switches further comprises feedback means for controlling the energy of said energy pulses by varying the width of said energy pulses by an amount inversely proportional to the change in amplitude of said waveform generated by said switch.

9. The multi-phase waveform generator of claim 6 further comprising:

synchronizing means connected to said timing generator and to a reference waveform for varying the rate at which said sequence of timing pulses is generated within predetermined limits, to maintain one waveform of said generated multi-phase waveforms in frequency and phase synchronism with said reference waveform so long as said reference waveform remains within a frequency range proportional to said predetermined limits.

10. The multi-phase waveform generator of claim 9 wherein said reference waveform is a power source waveform of a multi-phase power source, said waveform generator further comprising:

detecting means for providing an output when a condition indicative of failure of at least one of said waveforms being generated by said switches S1 through SN is detected;

bypass switch means connected to said multi-phase power source and to loads being driven by said switches S1 through SN;

bypass control means having inputs connected to said detecting means and to said synchronizing means and having an output connected to said bypass switch for transferring said loads from said switches S1 through SN to said multi-phase power source when an output signal is received from said detecting means while said generated multi-phase waveform is substantially in synchronism with said power source.

11. The multi-phase waveform generator of claim 6 wherein said encoding means further comprises:

memory means having a plurality of storage locations addressable by said timing generator, each of said locations having a bit position for each of said modulated pulse sequences P1 through PN, the presence and absence of bits in said bit positions constituting said modulation of said modulated pulse sequences;

and wherein said gating means further comprises:

sequence counter means for identifying said outputs of said memory means corresponding to each of said modulated pulse sequences P1 through PN in turn, said sequence counter means having a first input connected to a source of advance pulses, said sequence counter generating N counts before repeating said N counts;

phase time counter means for identifying each of said switching means in turn, said phase time counter means being connected to said source of advance pulses for generating N+1 counts before repeating said N+1 counts, a first output of said phase time counter being connected to said timing generator for advancing the addressed location of said memory means and being connected to an inhibit input of said sequence counter for inhibiting one advance pulse at said first input to keep said sequence counter in synchronism with said phase time counter, each of N remaining outputs of said phase time counter being connected to a different one of said switching means S1–SN for gating an identified one of said modulated pulse sequences to an identified one of said switching means in turn for each of said switching means S1–SN, as each of said memory locations is addressed;

said sequence counter having a second input connected to said timing generator for advancing said sequence counter by one count while said first input of said sequence counter is inhibited whenever said timing sequence is repeated to increment the count within said sequence counter with respect to the count within said phase time counter thereby incrementing said gating means.

12. The method of generating a waveform comprising the steps of:

repeatedly generating a plurality of timing pulses;

encoding each plurality of said timing pulses into an integral modulated pulse sequence;

controlling a power switch to generate positive voltage pulses a first time said integral modulated pulse sequence is generated;

controlling said power switch to generate negative voltage pulses a second time said integral modulated pulse sequence is generated;

integrating said positive and negative voltage pulses respectively to provide an electric power waveform.

13. The method of claim 12 further comprising the step of:
controlling the energy of said voltage pulses by varying the width of said voltage pulses by an amount inversely proportional to the change in amplitude of said generated waveform thereby providing amplitude regulation of said electric power waveform to compensate for variations of source potential and variations of the impedance of a load being driven by said electric power waveform.

14. The method of claim 13 further comprising the step of:
varying within predetermined limits, the rate at which said plurality of timing pulses is generated to maintain said electric power waveform in frequency and phase synchronism with an electric utility waveform as long as said utility waveform remains within a frequency range proportional to said predetermined limits.

15. The method of claim 14 further comprising the step of:
switching a load from said electric power waveform to said electric utility waveform if said electric power waveform is in synchronism with said utility waveform.

16. The method of claim 14 further comprising the step of:
switching a load from said utility waveform to said electric power waveform if said electric power waveform has been in synchronism with said utility waveform for a predetermined period of time.

17. The method of claim 14 wherein said varying step further comprises the steps of:
allowing a plurality of oscillator pulses to generate a lesser plurality of timing pulses;
inhibiting an oscillator pulse thereby increasing the time period between two of said timing pulses.

18. The method of claim 17 further comprising the steps of:
calculating the number of oscillator pulses which must be inhibited to reduce the frequency of said electric power waveform being provided to be in frequency and phase synchronism with said utility waveform;
repeating said step of allowing a plurality of oscillator pulses to generate a lesser plurality of timing pulses and said step of inhibiting an oscillator pulse, in sequence for the calculated number of times.

19. The method of claim 4 wherein said varying step further comprises the steps of:
allowing a plurality of oscillator pulses to generate a lesser plurality of timing pulses;
inhibiting at least one oscillator pulse thereby increasing the time period between two of said timing pulses;
calculating the number of oscillator pulses which must be inhibited to reduce the frequency of said multi-phase waveforms so that said generated waveform thereof is in frequency and phase synchronism with said reference waveform,
repeating said step of allowing a plurality of oscillator pulses to generate a lesser plurality of timing pulses and said step of inhibiting at least one oscillator pulse in sequence for the calculated number of times.

20. A waveform generator comprising:
a timing generator for repeatedly generating a plurality of timing pulses;
encoding means connected to said timing generator for encoding each of said plurality of timing pulses into an integral pulse modulated pulse sequence;
a switch connected to said encoding means for alternately generating a plurality of positive voltage pulses and a plurality of negative voltage pulses in response to a first integral modulated pulse sequence and a next integral modulated pulse sequence respectively;
means connected to said power switch to integrate each of said pluralities of voltage pulses to provide an electric power waveform.

* * * * *

UNITED STATES PATENT OFFICE
CERTIFICATE OF CORRECTION

PATENT NO. : 3,805,139
DATED : April 16, 1974
INVENTOR(S) : Harry S. Hoffman, Jr. et al It is certified that error appears in the above-identified patent and that said Letters Patent are hereby corrected as shown below:

Cover Page (22), "September 29, 1971" should read

---September 29, 1972---

Signed and Sealed this

Twenty-sixth Day of October 1976

[SEAL]

Attest:

RUTH C. MASON
*Attesting Officer*

C. MARSHALL DANN
*Commissioner of Patents and Trademarks*